UNITED STATES PATENT OFFICE.

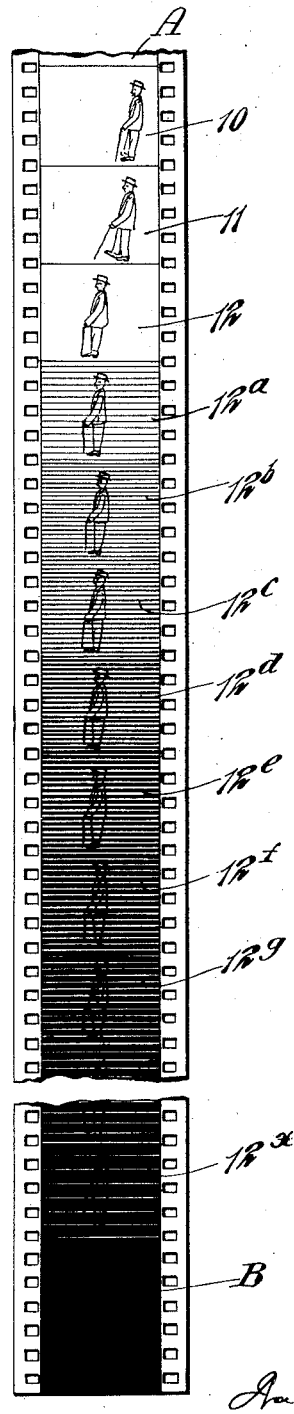

FRANK VON BRIESEN, OF NEW YORK, N. Y.

FILM FOR MOVING PICTURES.

1,011,564.  Specification of Letters Patent.  Patented Dec. 12, 1911.

Application filed August 15, 1911. Serial No. 644,115.

*To all whom it may concern:*

Be it known that I, FRANK VON BRIESEN, a citizen of the United States, residing at New York city, county and State of New York, have invented a new and Improved Film for Moving Pictures, of which the following is a specification.

With films as heretofore generally made, the display of the last picture on the film representing the end of a drama or other matter presented, was followed by an instantaneous darkening of the screen. In this way, the display which held the spectators' attention was so abruptly cut off as to impart a shock or a feeling of dissatisfaction, the same as would be the case were the actors on a stage after saying the last word suddenly wrapped into darkness instead of being gradually withdrawn from the audience either by their leisurely exit or by the slow lowering of the curtain.

My invention relates to a film in which this abrupt transition of light to darkness is obviated, so that a pleasant finale is obtained.

The drawing represents the end portion of a film embodying my invention.

In carrying out my invention, the film A is provided with the usual series of pictures 10, 11, 12, etc., illustrating the successive phases of a story, or other matter. The last picture of the series which shows the finale or last pose of the characters, etc., is reproduced a suitable number of times as at $12^a$, $12^b$, $12^c$, etc. All of these reproductions are identical in contour, but each image is printed somewhat darker than the preceding image, the last image $12^x$ being followed by a field B, which is substantially black. Thus when the film is displayed, the final scene will linger before the spectators' eyes for some time, and will while being exposed assume a gradually darkening tone that eventually goes over into black. In this way the subject matter of the last scene presented will be impressed upon the audience and by gradually vanishing from sight will avoid the objectionable abrupt transition above spoken of. In the manufacture of the films, the gradual darkening of the successive copies of the last picture may be obtained by reproducing it the desired number of times, while the light-controlling diaphragm is gradually closed or the power of the light is gradually reduced. It is obvious that the effect of gradually withdrawing the last picture from view may also be obtained by having the successive reproductions thereof made lighter instead of darker. In this case the last picture will be made to dissolve gradually into a white blank field instead of into a black blank field.

I claim:

1. A film for motion pictures provided with a series of prints representing consecutive phases, a last print of said series, and a plurality of reproductions of said last print directly succeeding the same, said reproductions being successively toned off to gradually merge into a blank field.

2. A film for motion pictures provided with a series of prints representing consecutive phases, a last print of said series, and a plurality of reproductions of said last print directly succeeding the same, said reproductions being successively printed in darker shades, to gradually merge into a black field.

FRANK VON BRIESEN.

Witnesses:
ARTHUR E. ZUMPE,
KATHERYNE KOCH.